(12) United States Patent
Hoff et al.

(10) Patent No.: US 7,231,626 B2
(45) Date of Patent: Jun. 12, 2007

(54) METHOD OF IMPLEMENTING AN ENGINEERING CHANGE ORDER IN AN INTEGRATED CIRCUIT DESIGN BY WINDOWS

(75) Inventors: Jason K. Hoff, Houston, TX (US); Viswanathan Lakshmanan, Thornton, CO (US); Michael Josephides, Broomfield, CO (US); Daniel W. Prevedel, Fort Collins, CO (US); Richard D. Blinne, Ft. Collins, CO (US); Johathan P. Kuppinger, Windsor, CO (US)

(73) Assignee: LSI Corporation, Milpitas, CA (US)

( * ) Notice: Subject to any disclaimer, the term of this patent is extended or adjusted under 35 U.S.C. 154(b) by 221 days.

(21) Appl. No.: 11/015,123

(22) Filed: Dec. 17, 2004

(65) Prior Publication Data
US 2006/0136855 A1 Jun. 22, 2006

(51) Int. Cl.
*G06F 17/50* (2006.01)
(52) U.S. Cl. .............................. 716/13; 716/14; 716/9; 716/10; 716/6
(58) Field of Classification Search .................. 716/13, 716/14, 9, 10, 5, 6
See application file for complete search history.

(56) References Cited

U.S. PATENT DOCUMENTS

| | | | | |
|---|---|---|---|---|
| 5,416,717 A * | 5/1995 | Miyama et al. ................ 703/14 |
| 5,761,080 A * | 6/1998 | DeCamp et al. ................ 716/5 |
| 5,847,967 A * | 12/1998 | Asao ............................... 716/5 |
| 5,953,236 A * | 9/1999 | Hossain et al. ................. 716/6 |
| 6,014,506 A * | 1/2000 | Hossain et al. ............... 716/11 |
| 6,141,663 A | 10/2000 | Hunkins et al. |
| 6,243,715 B1 | 6/2001 | Bogantz et al. |
| 6,317,865 B1 * | 11/2001 | Itoh ............................. 716/11 |
| 6,453,454 B1 * | 9/2002 | Lee et al. ...................... 716/11 |
| 6,536,028 B1 * | 3/2003 | Katsioulas et al. ........... 716/17 |
| 6,651,239 B1 * | 11/2003 | Nikitin et al. ................. 716/18 |
| 6,922,817 B2 * | 7/2005 | Bradfield et al. .............. 716/1 |
| 7,051,307 B2 * | 5/2006 | Ditlow et al. .................. 716/7 |
| 7,168,055 B2 * | 1/2007 | Hoff et al. ...................... 716/4 |
| 2004/0003366 A1 * | 1/2004 | Suzuki ........................ 716/11 |
| 2004/0199879 A1 * | 10/2004 | Bradfield et al. .............. 716/1 |

(Continued)

OTHER PUBLICATIONS

Xiang et al., "ECO Algorithms for Removing Overlaps Between Power Rails and Signal Wires", IEEE/ACM International Conference on Computer Aided Design, Nov. 10, 2002, pp. 67-74.*

*Primary Examiner*—Phallaka Kik
(74) *Attorney, Agent, or Firm*—Eric J. Whitesell

(57) ABSTRACT

A method of implementing an engineering change order includes steps of: (a) receiving as input an integrated circuit design; (b) receiving as input an engineering change order to the integrated circuit design; (c) creating at least one window in the integrated circuit design that encloses a change to the integrated circuit design introduced by the engineering change order wherein the window is bounded by coordinates that define an area that is less than an entire area of the integrated circuit design; (d) performing a routing of the integrated circuit design that excludes routing of any net that is not enclosed by the window; (e) replacing an area in a copy of the integrated circuit design that is bounded by the coordinates of the window with results of the incremental routing to generate a revised integrated circuit design; and (f) generating as output the revised integrated circuit design.

8 Claims, 5 Drawing Sheets

U.S. PATENT DOCUMENTS

2005/0015735 A1* 1/2005 Tamura et al. .................. 716/2
2005/0125756 A1* 6/2005 Ditlow et al. ................... 716/7
2005/0160391 A1* 7/2005 Orita ........................... 716/13
2005/0166169 A1* 7/2005 Kurzum et al. ............... 716/10
2005/0235240 A1* 10/2005 Tien ............................ 716/11
2006/0036982 A1* 2/2006 Hoff et al. ..................... 716/5
2006/0288322 A1* 12/2006 Zhang et al. .................. 716/9

* cited by examiner

METHOD OF IMPLEMENTING AN ENGINEERING CHANGE ORDER IN AN INTEGRATED CIRCUIT DESIGN BY WINDOWS

BACKGROUND OF THE INVENTION

1. Field of the Invention

The present invention relates generally to the design of integrated circuits. More specifically, but without limitation thereto, the present invention relates to methods of implementing an engineering change order (ECO) in an integrated circuit design.

2. Description of Related Art

In previous methods for implementing an engineering change order (ECO) request in an integrated circuit design, design tools are run for the entire integrated circuit design, even though the engineering change order typically is only a small fraction of the size of the integrated circuit design. For example, cell placement, routing, design rule check validation, and timing closure run times typically scale with the size of the entire integrated circuit design.

SUMMARY OF THE INVENTION

In one embodiment of the present invention, a method of implementing an engineering change order in an integrated circuit design by windows includes steps of:
(a) receiving as input an integrated circuit design;
(b) receiving as input an engineering change order to the integrated circuit design;
(c) creating at least one window in the integrated circuit design that encloses a change to the integrated circuit design introduced by the engineering change order wherein the window is bounded by coordinates that define an area that is less than an entire area of the integrated circuit design;
(d) performing a routing only for each net in the integrated circuit design that is enclosed by the window;
(e) replacing an area in a copy of the integrated circuit design that is bounded by coordinates of the window with results of the incremental routing to generate a revised integrated circuit design; and
(f) generating as output the revised integrated circuit design.

In another embodiment of the present invention, a computer program product for implementing an engineering change order in an integrated circuit design by windows includes:
a medium for embodying a computer program for input to a computer; and
a computer program embodied in the medium for causing the computer to perform steps of:
(a) receiving as input an integrated circuit design;
(b) receiving as input an engineering change order to the integrated circuit design;
(c) creating at least one window in the integrated circuit design that encloses a change to the integrated circuit design introduced by the engineering change order wherein the window is bounded by coordinates that define an area that is less than an entire area of the integrated circuit design;
(d) performing a routing of the integrated circuit design only for each net in the integrated circuit design that is enclosed by the window;
(e) replacing an area in a copy of the integrated circuit design that is bounded by coordinates of the window with results of the incremental routing to generate a revised integrated circuit design; and
(f) generating as output the revised integrated circuit design.

BRIEF DESCRIPTION OF THE DRAWINGS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some elements in the figures may be exaggerated relative to other elements to point out distinctive features in the illustrated embodiments of the present invention.

DESCRIPTION OF THE ILLUSTRATED EMBODIMENTS

In previous methods for implementing a functional or timing engineering change order (ECO) to an integrated circuit design, the typical turnaround time is typically about one week regardless of the size of the engineering change order. This is because although the engineering change order may only have a size of a few cells, it must be merged with an integrated circuit design that typically has a much greater size. For example, if an engineering change order for five cells may be required for an integrated circuit design that includes five million cells. As a result, design tool run times generally scale with the size of the entire integrated circuit design for routing, design rule check verification, net delay calculation, and parasitic extraction. Preferably, the time required to implement an engineering change order should depend on the number of net changes in the engineering change order rather than on the total number of nets in the entire integrated circuit design.

Figure 1:
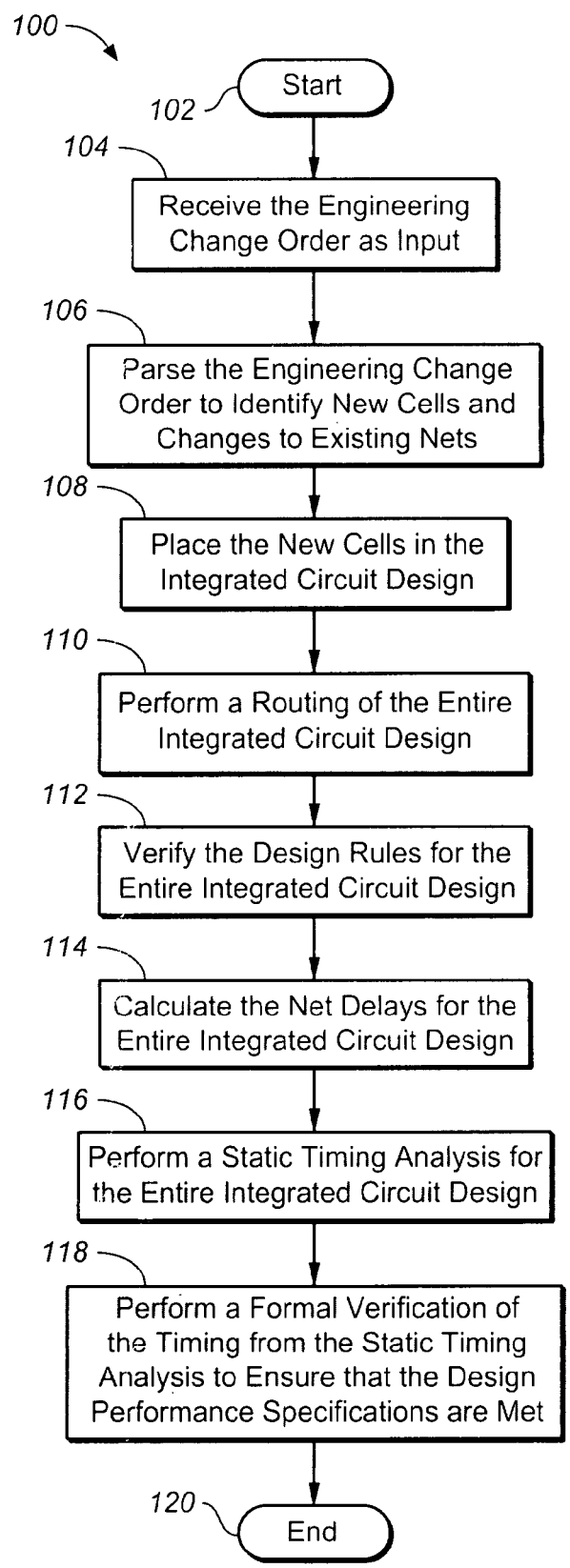
FIG. 1 illustrates a flow chart for a method of implementing an engineering change order in an integrated circuit design according to the prior art.

FIG. 1 illustrates a flow chart 100 for a method of implementing an engineering change order according to the prior art.

Step 102 is the entry point for the flow chart 100.

In step 104, the engineering change order is received as input.

In step 106, the engineering change order is parsed to identify new cells and changes to existing nets.

In step 108, the new cells are placed in the integrated circuit design by a software place and route design tool.

In step 110, a routing of the entire integrated circuit design is performed by the place and route design tool.

In step 112, the design rules for the technology used to manufacture the integrated circuit are verified for the entire integrated circuit design, for example, by design rule check software such as Mentor Calibre™.

In step 114, the net delays are calculated for the entire integrated circuit design.

In step 116, a parasitic extraction is performed for the entire integrated circuit design to determine the values of net coupling capacitance and parasitic resistance.

In step 118, a static timing analysis is performed for the entire integrated circuit design to determine the effect of net delay including net parasitic capacitance and resistance on the integrated circuit design.

In step 120, a formal verification of the timing is performed from the static timing analysis to ensure that the design timing specifications are met.

Step 122 is the exit point of the flow chart 100.

In the method of FIG. 1, steps 110, 112, 114 and 116 may be especially time consuming and resource intensive, depending on the complexity of the integrated circuit design. A significant savings in the resources required to perform routing, design rule check verification, net delay calculation, and parasitic extraction may be realized by creating windows in the integrated circuit design that include only the incremental changes to the overall integrated circuit design as follows.

In one embodiment of the present invention, a method of implementing an engineering change order in an integrated circuit design includes steps of:

(a) receiving as input an integrated circuit design;
(b) receiving as input an engineering change order to the integrated circuit design;
(c) creating at least one window in the integrated circuit design that encloses a change to the integrated circuit design introduced by the engineering change order wherein the window is bounded by coordinates that define an area that is less than an entire area of the integrated circuit design;
(d) performing a routing only for each net in the integrated circuit design that is enclosed by the window;
(e) replacing an area in a copy of the integrated circuit design that is bounded by coordinates of the window with results of the incremental routing to generate a revised integrated circuit design; and
(f) generating as output the revised integrated circuit design.

FIGS. 2A and 2B illustrate a flow chart 200 for a method of implementing an engineering change order in an integrated circuit design by windows.

Step 202 is the entry point for the flow chart 200.

In step 204, the engineering change order is received as input as in FIG. 1.

In step 206, the engineering change order is parsed to identify new nets and changes to existing nets that constitute the changes to the integrated circuit design in the same manner as in FIG. 1.

In step 208, the new cells are placed in the integrated circuit design, for example, by a software place and route design tool in the same manner as FIG. 1.

In step 210, windows are created that include the new cells and the net changes that constitute the changes to the integrated circuit design that are to be routed. The term "window" as used herein is defined as a rectilinear boundary that encloses an area of the integrated circuit design that is less than the entire area of the integrated circuit design. For example, a window may include a subset of nets that have been changed by the engineering change order. Alternatively, a window may include polygons that have been introduced or changed by the engineering change order. The window boundaries are calculated from the coordinates of the new polygons and the changed nets in the integrated circuit design database so that each of the changes to the integrated circuit design is enclosed by a window.

In step 212, each of the windows created in step 210 is streamed to an incremental router. The incremental routing may be performed by the same routing tool used in FIG. 1, however, only the nets that are modified by the engineering change order are routed, in contrast to routing the entire integrated circuit design as in FIG. 1. Windows that do not overlap may be routed in parallel, while windows that do overlap are routed serially so that any duplicated routing may be removed. If any nets in a window are found open, that is, not all of the net connections are included in the window, then the net is "frozen", which means that the net may not be changed by the router. In addition, a partition manager is preferably included in the incremental router that allows the user to expand the size of the windows and merge overlapping windows.

In step 214, the incremental routing changes are merged into the design database, for example, by replacing the contents enclosed by the coordinates of each window in a copy of the original integrated circuit design by the contents of the window to generate a revised integrated circuit design.

In step 216, windows are created that include the polygon changes from the engineering change order.

In step 218, the windows that include the polygon changes from the engineering change order are streamed into an incremental design rule check tool. The incremental design rule check tool checks only the polygons that were changed, advantageously avoiding unnecessary re-checking of the all the polygons in the integrated circuit database.

In step 220, incremental net delays are calculated only for the windows that include modified nets, advantageously avoiding unnecessary re-calculation of all the net delays in the integrated circuit design.

In step 222, the windows that include modified nets and affected nets are streamed to a parasitic extraction tool. An affected net is a net that has a coupling capacitance with a modified net that exceeds a predefined coupling capacitance threshold.

In step 224, parasitic values are extracted for each window, and a separate standard parasitic extraction format (SPEF) file is generated by the parasitic extraction tool for each window.

In step 226, a static timing analysis is performed for the revised integrated circuit design in the same manner as in FIG. 1.

In step 228, a formal verification of the timing is performed from the static timing analysis to ensure that the design performance specifications for the revised integrated circuit design are met in the same manner as in FIG. 1.

Step 230 is the exit point of the flow chart 200.

Figure 2:
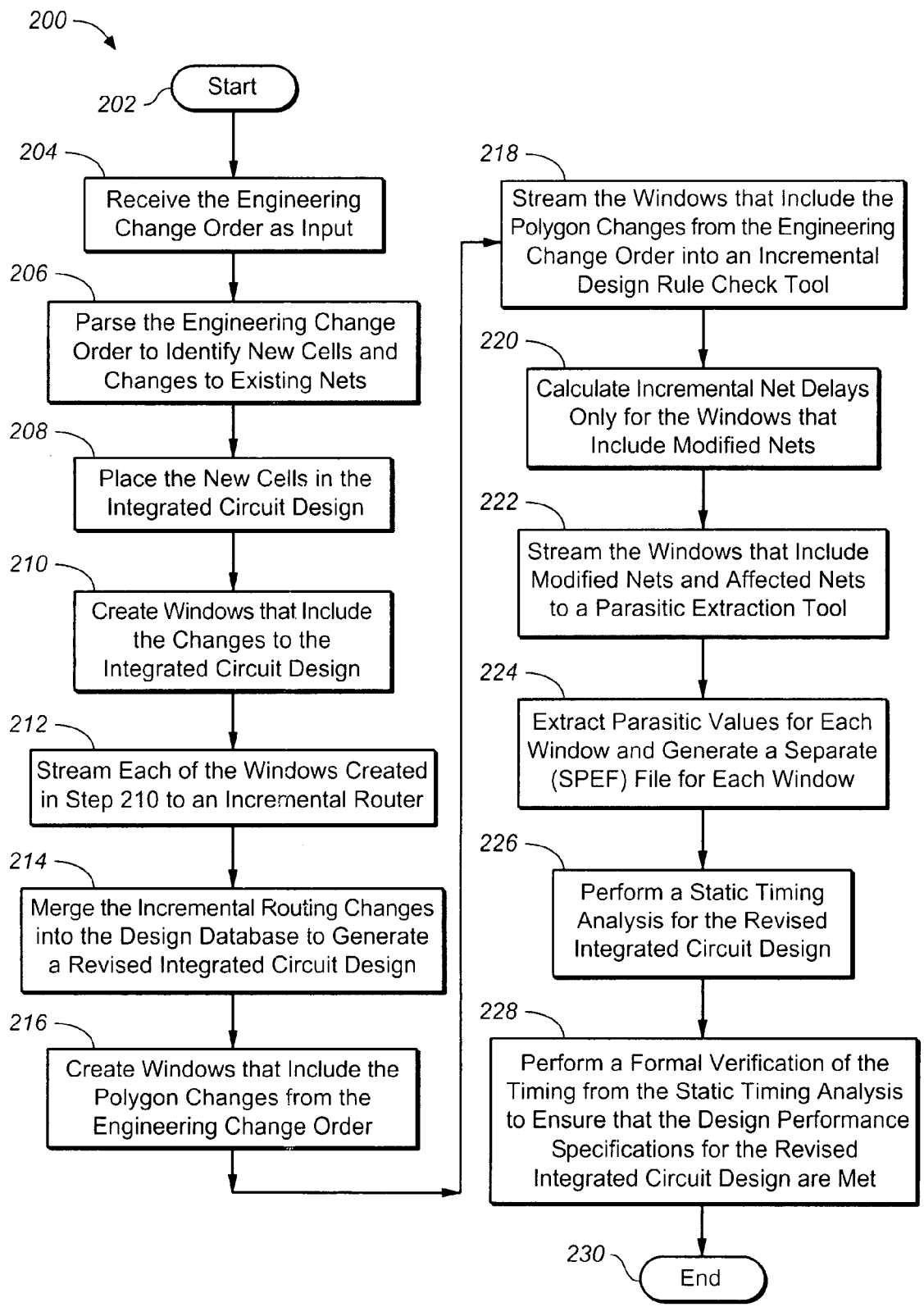
FIGS. 2A and 2B illustrate a flow chart for a method of implementing an engineering change order in an integrated circuit design by windows.
Figure 3:
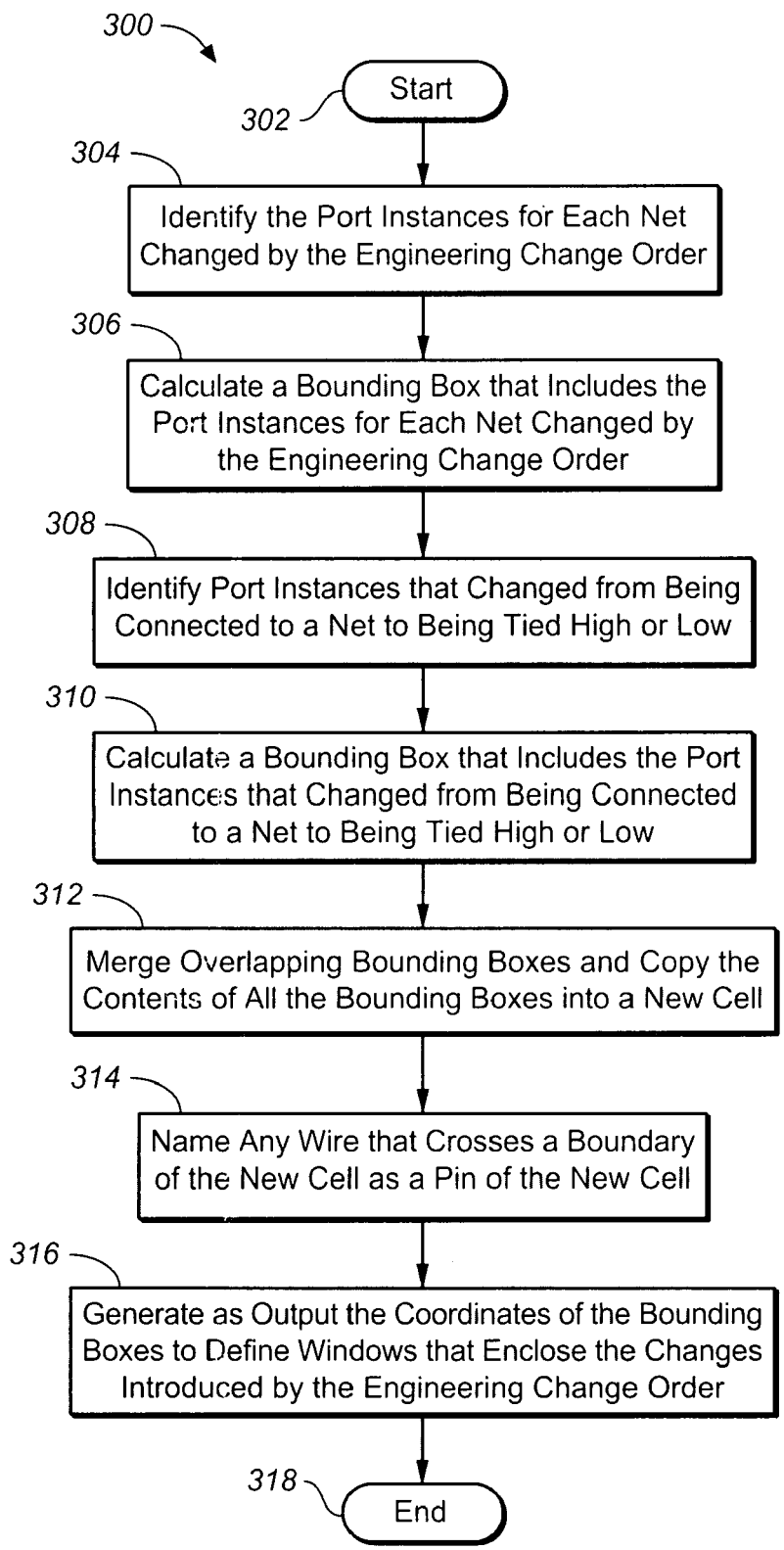
FIG. 3 illustrates a flow chart for creating an engineering change order window for FIGS. 2A and 2B.

FIG. 3 illustrates a flow chart 300 for creating an engineering change order window for FIG. 2.

Step 302 is the entry point of the flow chart 300.

In step 304, the port instances for each net changed by the engineering change order are identified. A net change may be, for example, a net that has moved or has different connections.

In step 306, a bounding box that includes the port instances for each net changed by the engineering change order is calculated from the net coordinates in the design database of the original integrated circuit design.

In step 308, port instances that changed from being connected to a net to being tied high or low are identified.

In step 310, a bounding box that includes the port instances that changed from being connected to a net to being tied high or low is calculated from the coordinates in the design database.

In step 312, overlapping bounding boxes are merged, and the contents of all the bounding boxes are copied into a new cell.

In step 314, any wire that crosses a boundary of the new cell is named as a pin of the new cell.

In step 316, the coordinates of the bounding boxes are generated as output to define windows that enclose the changes introduced by the engineering change order.

Step 318 is the exit point of the flow chart 300.

Figure 4:
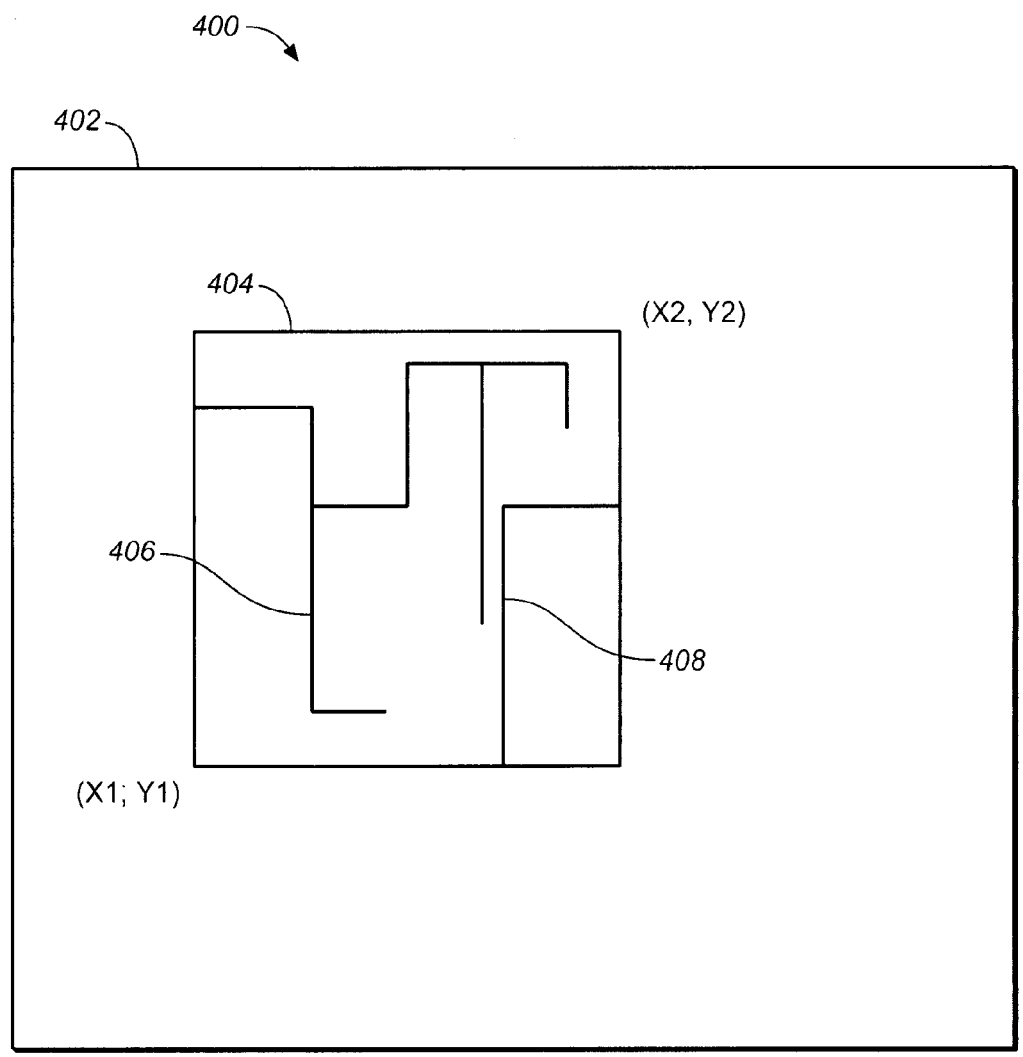
FIG. 4 illustrates a diagram of a window in an integrated circuit design.

FIG. 4 illustrates a diagram of a window in an integrated circuit design. Shown in FIG. 4 are an integrated circuit design 402, a window 404, a changed net 406, and an affected net 408.

In FIG. 4, The window 404 is bounded by the coordinates (X1, Y1):(X2, Y2) that enclose the changed net 406 and the affected net 408. The area enclosed by the window 404 is less than the entire area of the integrated circuit design 402, thereby reducing the number of calculations required to implement the engineering change order.

In this example, the changed net 406 has been moved, resulting in a coupling capacitance with the affected net 408 that exceeds a threshold coupling capacitance. The affected net 408 is therefore included in the window for calculating the incremental net delay and for performing the parasitic extraction.

Figure 5:
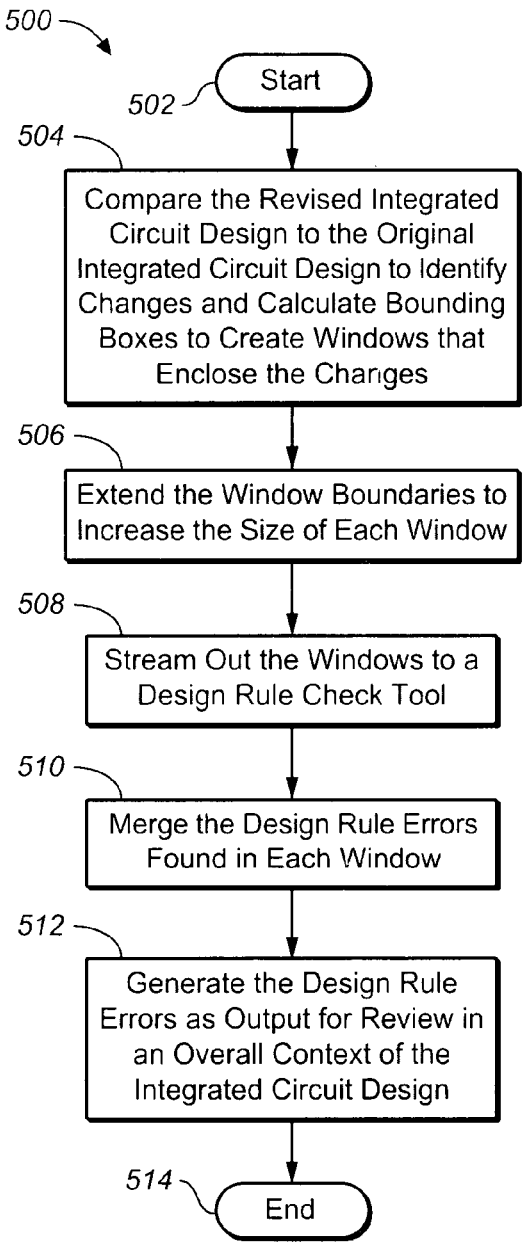
FIG. 5 illustrates a flow chart for performing an incremental design rule check for FIGS. 2A and 2B.

FIG. 5 illustrates a flow chart 500 for performing an incremental design rule check for FIGS. 2A and 2B

Step 502 is the entry point of the flow chart 500.

In step 504, the revised integrated circuit design is compared to the original integrated circuit design to identify changes, and bounding boxes are calculated to create windows that enclose only the physical changes and not the entire nets.

In step 506, the window boundaries are extended to increase the size of each window, forming a halo margin or region around each window. The halo region allows the design rule check software to examine objects that are nearby each window. The size of the halo margin may be determined, for example, by the design rule check tool or by the user to ensure that there is sufficient room for the spacing rules to work correctly.

In step 508, the windows are streamed out, for example, in GDSII format, to a design rule check tool, which may be the same as that used in FIG. 1.

In step 510, the design rule errors found in each window are merged together, removing any errors in the halo region.

In step 512, the design rule errors are generated as output for review in an overall context of the integrated circuit design.

Step 514 is the exit point of the flow chart 500.

The flow chart described above may also be implemented by instructions for being performed on a computer. The instructions may be embodied in a disk, a CD-ROM, and other computer readable media according to well known computer programming techniques.

In another aspect of the present invention, a computer program product for analyzing noise for an integrated circuit design includes:

a medium for embodying a computer program for input to a computer; and a computer program embodied in the medium for causing the computer to perform steps of:

(a) receiving as input an integrated circuit design;

(b) receiving as input an engineering change order to the integrated circuit design;

(c) creating at least one window in the integrated circuit design that encloses a change to the integrated circuit design introduced by the engineering change order wherein the window is bounded by coordinates that define an area that is less than an entire area of the integrated circuit design;

(d) performing a routing only for each net in the integrated circuit design that is enclosed by the window;

(e) replacing an area in a copy of the integrated circuit design that is bounded by coordinates of the window with results of the incremental routing to generate a revised integrated circuit design; and (f) generating as output the revised integrated circuit design.

Figure 6:
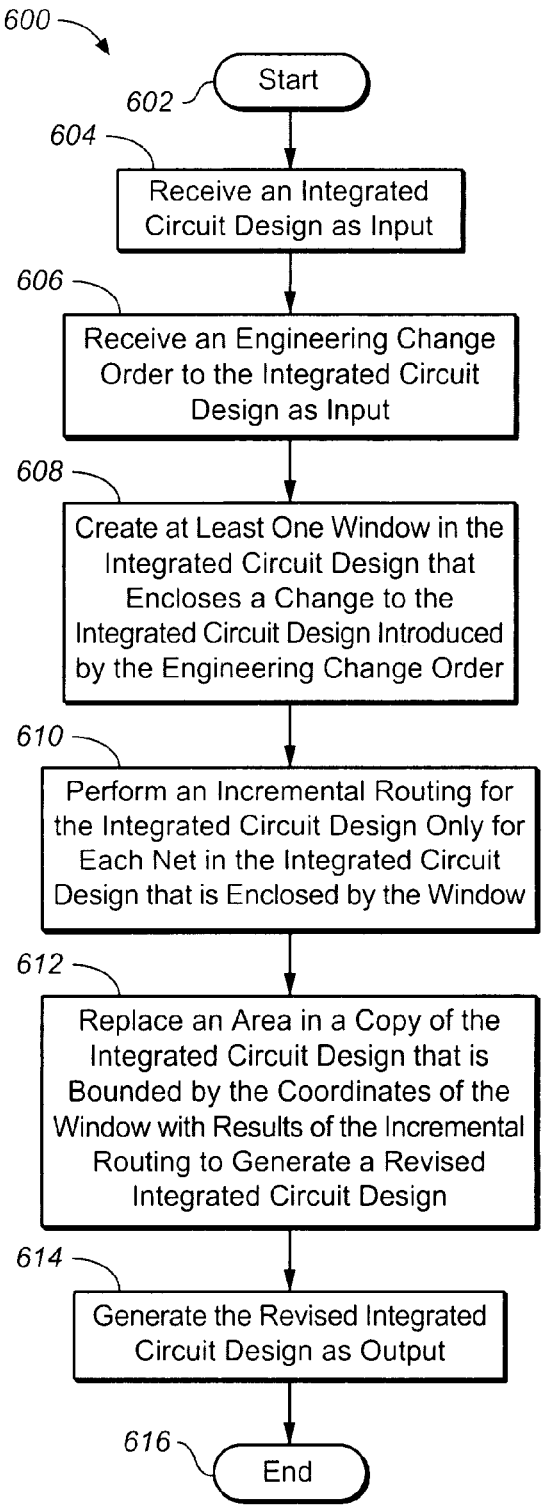
FIG. 6 illustrates a flow chart of a computer program for implementing an engineering change order in an integrated circuit design by windows.

FIG. 6 illustrates a flow chart 600 of a computer program for implementing an engineering change order in an integrated circuit design by windows.

Step 602 is the entry point of the flow chart 600.

In step 604, an integrated circuit design is received as input.

In step 606, an engineering change order to the integrated circuit design is received as input.

In step 608, at least one window is created in the integrated circuit design that encloses a change to the integrated circuit design introduced by the engineering change order. The window is bounded by coordinates that define an area that is less than an entire area of the integrated circuit design.

In step 610, an incremental routing is performed for the integrated circuit design only for each net in the integrated circuit design that is enclosed by the window, advantageously avoiding repeating calculations for nets that are not changed or affected by the engineering change order.

In step 612, an area in a copy of the integrated circuit design that is bounded by the coordinates of the window is replaced with results of the incremental routing to generate a revised integrated circuit design.

In step 614, the revised integrated circuit design is generated as output.

Step 616 is the exit point of the flow chart 600.

Although the methods illustrated by the flowchart descriptions above are described and shown with reference to specific steps performed in a specific order, these steps may be combined, sub-divided, or reordered without departing from the scope of the claims. Unless specifically indicated herein, the order and grouping of steps are not limitations of the claims.

The specific embodiments and applications thereof described above are for illustrative purposes only and do not preclude modifications and variations that may be made thereto by those skilled in the art within the scope of the following claims.

What is claimed is:

1. A method comprising steps of:

(a) receiving as input an integrated circuit design;

(b) receiving as input an engineering change order to the integrated circuit design;

(c) creating at least one window in the integrated circuit design that encloses a change to the integrated circuit design introduced by the engineering change order wherein the window is bounded by coordinates that define an area that is less than an entire area of the integrated circuit design;

(d) performing an incremental routing of the integrated circuit design only for each net in the integrated circuit design that is enclosed by the window;

(e) replacing an area in a copy of the integrated circuit design that is bounded by the coordinates of the window with results of the incremental routing to generate a revised integrated circuit design; and (f) generating as output the revised integrated circuit design.

2. The method of claim 1 further comprising a step of calculating a net delay only for each net in the integrated circuit design that is enclosed by the window.

3. The method of claim 1 further comprising a step of performing a design rule check only for each net in the integrated circuit design that is enclosed by the window.

4. The method of claim 1 further comprising a step of performing a parasitic extraction only for each net in the integrated circuit design that is enclosed by the window.

5. A computer readable storage medium tangibly embodying instructions for a computer that when executed by the computer implement a method for implementing an engineering change order in an integrated circuit design by windows, the method comprising steps of:

(a) receiving as input an integrated circuit design;

(b) receiving as input an engineering change order to the integrated circuit design;

(c) creating at least one window in the integrated circuit design that encloses a change to the integrated circuit design introduced by the engineering change order wherein the window is bounded by coordinates that define an area that is less than an entire area of the integrated circuit design;

(d) performing an incremental routing only for each net in the integrated circuit design that is enclosed by the window;

(e) replacing an area in a copy of the integrated circuit design that is bounded by coordinates of the window with results of the incremental routing to generate a revised integrated circuit design; and (f) generating as output the revised integrated circuit design.

6. The computer readable storage medium of claim 5 wherein the method further comprises a step of calculating a net delay only for each net in the integrated circuit design that is enclosed by the window.

7. The computer readable storage meduim of claim 5 wherein the method further comprises a step of performing a design rule check only for each net in the integrated circuit design that is enclosed by the window.

8. The computer readable storage medium of claim 5 wherein the method further comprises a step of performing a parasitic extraction only for each net in the integrated circuit design that is enclosed by the window.

* * * * *